United States Patent
Kaul et al.

(10) Patent No.: US 10,901,787 B2
(45) Date of Patent: Jan. 26, 2021

(54) ARTIFICIAL INTELLIGENCE (AI) BASED RESOURCE IDENTIFICATION

(71) Applicant: ACCENTURE GLOBAL SOLUTIONS LIMITED, Dublin (IE)

(72) Inventors: Rinku Kaul, Bangalore (IN); N. R Srikanth, Bangalore (IN); Shoba Kariappa, Bangalore (IN); Sangita Agarwal, Bangalore (IN); Niren Saha, Bangalore (IN); Bharanidharan Sundaramoorthy, Chennai (IN); Chellappan Murugappan, Chennai (IN); Sreedhar P. Seetharam, Bangalore (IN); Vijay Srinivas, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 150 days.

(21) Appl. No.: 16/166,889

(22) Filed: Oct. 22, 2018

(65) Prior Publication Data

US 2020/0073716 A1  Mar. 5, 2020

(30) Foreign Application Priority Data

Aug. 31, 2018 (IN) .............................. 201811032727

(51) Int. Cl.
*G06F 9/455* (2018.01)
*G06F 9/46* (2006.01)
(Continued)

(52) U.S. Cl.
CPC .......... *G06F 9/5011* (2013.01); *G06F 9/5055* (2013.01); *G06F 16/24578* (2019.01);
(Continued)

(58) Field of Classification Search
CPC .... G06F 9/5011; G06F 9/5055; G06F 16/367; G06F 16/24578; G06F 17/18;
(Continued)

(56) References Cited

U.S. PATENT DOCUMENTS

2013/0086054 A1* 4/2013 Wang ................... G06F 16/1767
707/725
2013/0226638 A1* 8/2013 Colvard ................ G06Q 10/06
705/7.14
(Continued)

FOREIGN PATENT DOCUMENTS

WO  WO-2017184723 A1 * 10/2017 ........... G06F 16/258

OTHER PUBLICATIONS

Audun Vennesland, Matcher Composition for Identification of Subsumption Relations in Ontology Matching, 2017, pp. 154-161. https://dl.acm.org/doi/pdf/10.1145/3106426.3106503 (Year: 2017).*

*Primary Examiner* — Mongbao Nguyen
(74) *Attorney, Agent, or Firm* — Mannava & Kang, P.C.

(57) ABSTRACT

An Artificial Intelligence (AI) based resource identification system enables identifying available resources in response to receiving a request for resources. The request attributes are mapped to the attributes of the resources in a resource pool. Matching index scores are calculated and resources that match the request can be selected based on the matching index scores. If no resources are available suitable alternate resources with lower matching index scores are suggested so that a user has the choice to filter this alternate resources based on a threshold score. Particular suggestions to change one or more of the request attributes can be provided based on analysis of the mapping of the request and the resource attributes which enables the resource identification system to (Continued)

suggest changes to one or more of the skill attributes, level attributes, time attributes or location attributes of the request.

19 Claims, 13 Drawing Sheets

(51) Int. Cl.
- *G06F 9/50* (2006.01)
- *G06N 7/00* (2006.01)
- *G06F 17/18* (2006.01)
- *G06F 16/36* (2019.01)
- *G06F 16/2457* (2019.01)

(52) U.S. Cl.
CPC ............ *G06F 16/367* (2019.01); *G06F 17/18* (2013.01); *G06N 7/005* (2013.01); *G06F 2209/503* (2013.01); *G06F 2209/5011* (2013.01); *G06F 2209/5021* (2013.01); *G06F 2209/5022* (2013.01)

(58) Field of Classification Search
CPC ..... G06F 2209/5011; G06F 2209/5021; G06F 2209/5022; G06F 2209/503; G06N 7/005
See application file for complete search history.

(56) References Cited

U.S. PATENT DOCUMENTS

| | | | |
|---|---|---|---|
| 2013/0290312 A1* | 10/2013 | Leslie | G06F 16/26 707/723 |
| 2014/0006416 A1* | 1/2014 | Leslie | G06F 16/248 707/748 |
| 2014/0122143 A1* | 5/2014 | Fletcher | G06Q 10/0631 705/7.14 |
| 2015/0073824 A1* | 3/2015 | Norris | G06F 16/24575 705/2 |
| 2016/0034305 A1* | 2/2016 | Shear | G06F 16/248 707/722 |
| 2016/0100002 A1* | 4/2016 | Dimonte | H04L 67/1014 709/203 |
| 2017/0177596 A1* | 6/2017 | Comstock | H04L 51/20 |
| 2017/0371925 A1* | 12/2017 | Arya | G06F 16/9024 |
| 2018/0096274 A1* | 4/2018 | DeZeeuw | G06F 7/08 |
| 2018/0232682 A1* | 8/2018 | Dravneek | G06Q 10/063112 |
| 2019/0018904 A1* | 1/2019 | Russell | G06F 16/9024 |
| 2019/0364130 A1* | 11/2019 | Rogynskyy | G06F 11/3024 |
| 2020/0042920 A1* | 2/2020 | Moorthy | G06Q 10/08 |

* cited by examiner

FULFILLMENT VIA INTERNAL CHANNEL: 70% | NUMBER OF DAYS TO FULFILL: 30-85 DAYS | RISH IN STAFFING: LOW  > FUTURE STAFFABILITY COMMENTS

USER EXPERIENCE RESEARCH | SE | CITY 1 — 1102

| TOTAL DEMAND | CURRENT BENCH | TENTATIVE ROLL OFFs WITHIN IG | TENTATIVE ROLL OFFs OTHER IG | ROTATION ELIGIBLE SUPPLY | OVERALL ACCENTURE |
|---|---|---|---|---|---|
| 8 | 1 | 3 | 10 | 15 | 10 | 15 | 109 | 157 |

START DATE: 13 JUNE 2018

☐ INPUT LOCATION  ☐ OTHER LOCATION

FULFILLMENT VIA INTERNAL CHANNEL: 50% | NUMBER OF DAYS TO FULFILL: 30-85 DAYS | RISH IN STAFFING: MEDIUM  > FUTURE STAFFABILITY COMMENTS

JAVA DEVELOPER | ITL | CITY 2 — 1104

| TOTAL DEMAND | CURRENT BENCH | TENTATIVE ROLL OFFs WITHIN IG | TENTATIVE ROLL OFFs OTHER IG | ROTATION ELIGIBLE SUPPLY | OVERALL ACCENTURE |
|---|---|---|---|---|---|
| 137 | 1 | 3 | 10 | 15 | 10 | 15 | 109 | 157 |

START DATE: 13 JUNE 2018

FULFILLMENT VIA INTERNAL CHANNEL: 10% | NUMBER OF DAYS TO FULFILL: 30-85 DAYS | RISH IN STAFFING: HIGH  > FUTURE STAFFABILITY COMMENTS

1100

US 10,901,787 B2

ARTIFICIAL INTELLIGENCE (AI) BASED RESOURCE IDENTIFICATION

PRIORITY

The present application claims priority under 35 U.S.C. 119(a)-(d) to the Indian Non-Provisional Patent Application Serial No. 201811032727, having a filing date of Aug. 31, 2018, the disclosure of which is hereby incorporated by reference in its entirety.

BACKGROUND

Modern day organizational environments are heavily dependent on computing and communication systems for execution of their tasks. An organization's workforce may be primarily interacting with its computing systems in carrying out its various duties. The increasing use of computing systems to execute various complex tasks has given rise to Artificial Intelligence (AI) technologies wherein smart machines capable of independent decision making are developed. Various reasons such as development of computational resources capable of processing large amount of data, the explosive growth of data that is available for processing (Big Data), the focus on specific tasks or problems and development of machines capable of receiving feedback and improving thereon are a few of the reasons for the rise of AI technologies in our everyday life.

BRIEF DESCRIPTION OF DRAWINGS

Features of the present disclosure are illustrated by way of examples shown in the following figures. In the following figures, like numerals indicate like elements, in which:

FIG. 8 shows a user interface (UI) that shows shortlisted resources which match request attributes in accordance with the examples disclosed herein.

FIG. 11A shows an abbreviated profiles UI that displays the brief details of some resource profiles in accordance with the examples disclosed herein.

DETAILED DESCRIPTION

Figure 1:
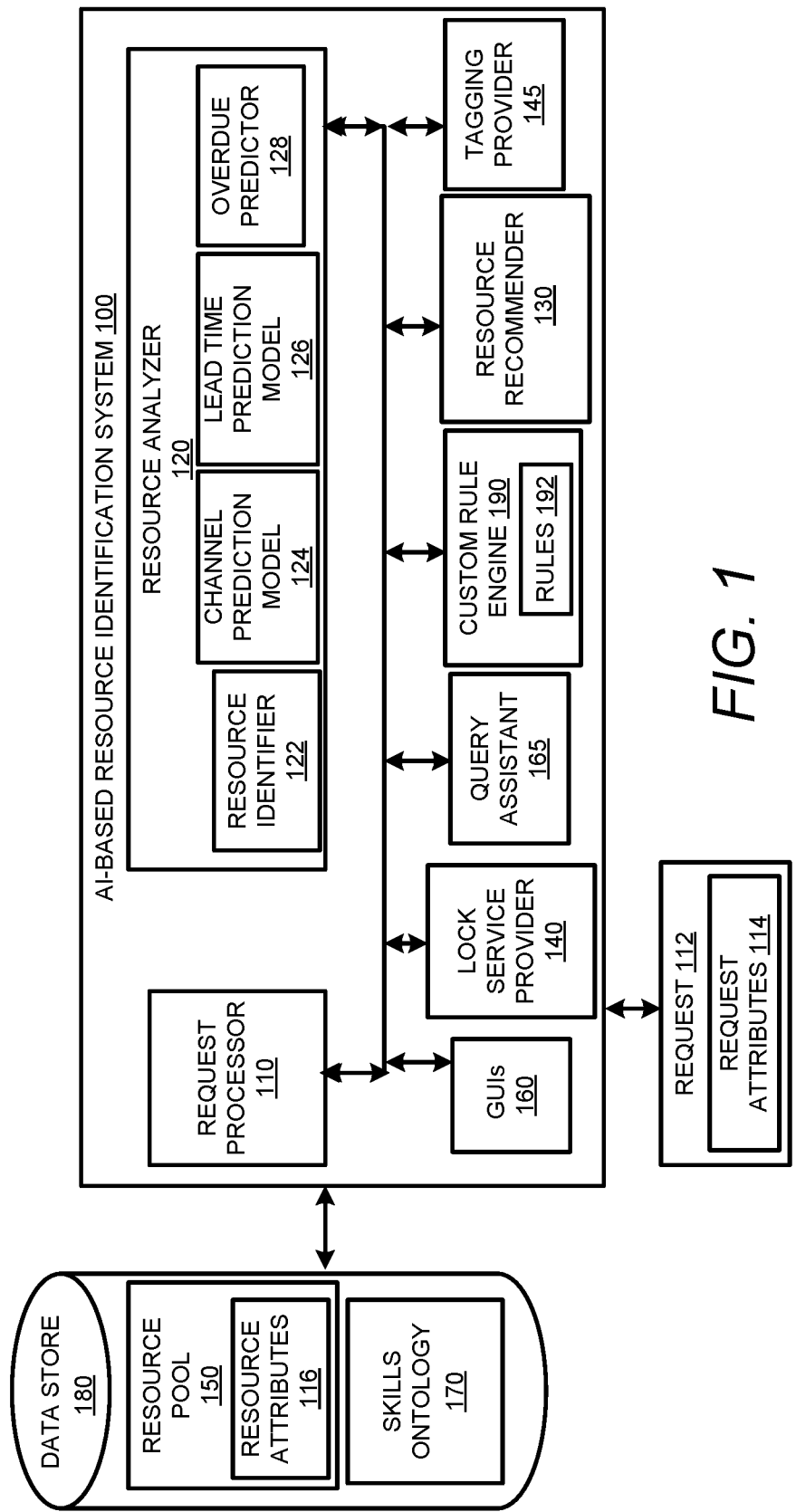
FIG. 1 is a block diagram that shows an AI-based resource identification system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

The AI-based resource identification system disclosed herein enables analyzing attributes of a received request for resources, identifying the resources that match the request attributes and providing access to the matching resources to the requestor. The resources requested can pertain to human resources in one example, wherein a user or the requestor searches a resource pool for a resource who will fit the current requirements as specified by the attributes of the request. The request can be received via an input GUI which can require the requestor to fill in particular fields that can be employed as search terms to search the resource pool to identify one or more resources who have attributes that match the request attributes. If matching resources are identified, the corresponding links to the matching resources can be transmitted to the requestor. If no matching resources are found, the resource identification system may provide suggestions for identifying alternate resources in order to fulfil the request.

In an example, the request can pertain to a project being undertaken by the requestor who is looking for resources to work on the project. The project can pertain to a piece of work that is to be completed manually, by machines or by a combination of manual labor and machines. A search for a resource can therefore pertain to both human resources in some examples. In an example, the search for resources may be confined to locating human resources. The requestor can initially look for resources within the organization to fulfil the request. Accordingly, the request can include attributes such as but not limited to skills attributes, time attribute and location attribute. The skills attributes can specify the particular skills, educational qualifications or other domain-specific knowledge that the requestor is looking for in the resources. The skills attributes can include a primary skill which is a 'must-have' skill that the requestor requires in potential matching resources and secondary skills which include 'good-to-have' skills that the matching resource needs to possess. In addition, the matching resource needs to be available during the time period specified by the time attributes and the matching resource has to be available at the location specified by the location attribute of the request with the appropriate hierarchical and experience level (i.e. career level).

In an example, the resource pool can include resource attributes including the identification information of the resource, the skills, work history, experience level, interests, and hierarchical level held within the organization, current position and the like. The resource attributes can additionally include current work assignment details of the resource such as the current project, duration of the project, the current location of work and the like. Information regarding matching resources can be provided to the requestor, for example, as links to the profiles of the matching resources. The current location of the matching resource can match to the location attribute of the request. In another instance, the matching resource can indicate in the resource location attribute, availability at the location specified in the request location attribute. Similarly, the time of availability of the resource also needs to match the time attribute of the request.

Accordingly, component-wise scores are obtained for each attribute match between the request attributes and each resource attributes. The match between the attributes can be scored using AI-based predictive matching model. In an example, the AI based predictive matching model can employ one of linear regression and logistic regression techniques to model the various request/resource attributes. The predictive matching model can be trained explicitly on prior data that matched requests to resources. By the way of illustration and not limitation, the matching model can employ a skill match parameter, to match the primary skills, which provides a yes/no output for matching skills. Similarly a specialty match or a secondary skill match parameter and a capability model can provide a yes/no output. A level difference parameter can provide output indicative of the exact match, one level up, one level down, and differences of two or more levels. In an example, level differences above one level may not be permitted. A location parameter provides a yes/no output for the location match. Various depreciation factors as specified herein are applied and a final matching index score is obtained for each resource matched up against the request. In an example, the matching index score can be compared to a predetermined match threshold and the resources that meet the threshold can be selected as resources servicing the request. Links to the profiles of the matching resources can be transmitted to the requestor for further processing.

If however, none of the resources have attributes that match the request attributes, the requestor can be advised that there are no matching resources available within the resource pool and to alter the request attributes. More particularly, the component scores can be accessed and one or more of the skills, career levels, location and time attributes of the request that is contributing to the low matching index score can be identified. Based on the identification of the low scoring component, the resource identification system can produce suggestions automatically with or without human input to the requestor to update or change the values of the corresponding low scoring attribute. Accordingly, the resource identification system can suggest changing one or more of the time or location attribute of the request. If the low scoring component pertains to the skill attribute such as the primary skill, the skill ontology can be accessed and a closely related skill can be identified. Resources who possess expertise in the closely related skill and who meet the time and location attributes of the request can be presented to the requestor. Similarly, career levels may also be changed so that for a given skill, time and location attributes if an individual who is a level above or below the required experience/hierarchical level, then such an individual can be selected as a matching resource.

The resource identification system not only services currently pending requests but also enables estimating prospective resources or future availability of resources based on historic patterns. The resource identification system includes a channel prediction model that predicts a probability of fulfilment using an internal channel i.e., using resources within the organization or an external channel wherein a resource from outside the organization is to be bought in. A resource from the external channel may be a resource whose information does not current exist in the resource pool. The channel prediction model can be trained based on historical data. In addition, a lead time prediction model can be similarly trained to predict the lead time to fulfil the request or the number of days until the request is fulfilled. An overdue prediction model can also be employed to predict the probability that the request will turn overdue or may not be fulfilled. Thus, based on the probabilities outputted by the various models, the requestor can select attributes or frame requests that have a higher probability of being fulfilled.

Examples of the resource identification system disclosed herein provide for enabling the requestor to secure resources even if currently no resources are available for the request attributes. The resource identification system includes multiple AI-based models such as the channel prediction model, the lead time prediction model and the overdue prediction model that can determine the probability of the request being fulfilled and the time need to fulfil the request based on the historical data. In addition, the resource identification system provides auto suggestions regarding the attributes of the request that can be altered in order to enhance the probability of the request being fulfilled. As the result, the embodiments disclosed herein provide technical improvements to the resource identification system by providing additional intelligence that a resource identification system that does not include the AI models described herein would not possess. The resource identification system therefore enables requestors to select request attributes so that the requests for resources have higher probabilities of being fulfilled. Moreover, the resource identification system includes a query assistant that employs natural language based dialog for exchanging communications with a user. The query assistant even mitigates the need for the user to frame requests as it proactively suggests alternate attributes and executes the requests for the suggested attributes.

FIG. 1 is a block diagram that shows the AI-based resource identification system 100 in accordance with examples disclosed herein. The resource identification system 100 can include processors and data store(s) 180 with instructions that enable the resource identification system 100 to receive a request 112 for a resource with specific attributes, analyze information from a resource pool 150 for matching resources and provides access to the matching resources in response to the received request 112. The resource identification system 100 includes a request processor 110, a resource analyzer 120, a resource recommender 130 and a lock service provider 140. The request processor 110 receives the request 112 and identifies request attributes 114 which can include but are not limited to skill attributes, career level attribute, time attributes and location attributes. The request 112 can be received via one of the GUIs 160 such as an input GUI included in the resource identification system 100. In some examples the request 112 can include an email or a file such as a spreadsheet or a comma separated value (CSV) file with multiple requests. If files are used for transmitting the requests then the files can be processed such as via parsing and tokenization in order to obtain the attributes of the one or more requests.

The skill attributes of the request 112 can include the kind of skills a requestor desires for the resource which can include the primary skills and the secondary skills. The primary skills can include 'must-have' skills of prospective resources while secondary skills can include 'nice to have' skills. In addition, skill attributes can include levels of proficiency within each of the skills measured in terms of number of years of experience with the skill and the degrees or certifications possessed by the resource. The primary and secondary skills can be assigned different weightages based on the experience, qualifications etc. when matching up the prospective sources to the request 112. The hierarchical level within an organization of a resource can also be factored into the skill attributes in some examples.

The resource identification system 100 includes a skills ontology 170 that is developed as a relational map based on the relationships between the various skills within a skill inventory. The relationships between the skills can be established based on various factors including but not limited to, the domain to which the skills belong, the number of people who possess the skills in common, the number times the skills are required within a single request and the like. For example, the higher number of times that the skills occur together in the request attributes or the resource attributes, stronger will be the relationships between the skills. A skill inventory can list the various skills possessed by individuals (i.e. resources) employed within an organization. In an example, the skills ontology 170 can pertain to a particular domain such as web technologies, mobile apps, databases, NLP and the like. The skills ontology 170 enables staffing of near skills so that when a specific skill pertaining to the request 112 is not available within the prospective resources, then one or more other skills that serve as the next best alternatives can be employed to fulfil the request 112. The skills ontology 170 can include relationships between pairs of skills and the strengths of relationships between the pairs of skills. In an example, statistical modeling can be used to find the relations as well the strengths of the relations between hundreds or even thousands of skills to build the skills ontology 170. The skills ontology 170 enables the resource identification system 100 to quantify the flexibility in the demands or resource request creation and enables creating customized training paths that align individual abilities/interests to organizational needs.

Another one of the request attributes 114 can include career level attributes which pertain to the experience in the requested skills and hierarchical level in the organization, time attributes which pertain to the time period for which the resource will be utilized. In an example, the time attributes can include a start date and/or an end date defining the time period of engagement of the resource for fulfilling the request 112. Location attributes which specify the location at which the resource servicing the request needs to be physically located are also included within the request attributes 114. In an example, the location can be flexible wherein the resource can execute tasks to fulfil the request 112 from remote locations. For such flexibility in locations, the location attribute may be left blank, for example, in the input GUI and the resource identification system 100 can pick up the location attribute as 'flexible' so that a resource with the necessary skill attributes and time attributes will be selected from any of the available locations.

The various request attributes as defined herein are extracted from the request 112 and matched with attributes of the prospective resources. The information regarding the resources or individuals can include data which is normally included in the resume of an individual such as the person's name, address, contact information, educational qualification, work history, interests, skills including technical, language, or other skills and the like. However, the request 112 may be geared towards identifying the resources internally within the organization. In this case, the work history can include greater details than what would normally be included in a resume. The resource information can include detailed description of the various tasks/projects, the ratings of the projects, the reviews associated with the person, and the like. The resource information can be organized as discrete name-value pairs to include resource skill attributes, resource time attributes and resource location attributes and made available as resource attributes 116 for matching up with various requests that may be received by the resource identification system 100. The resource skill attributes can list various primary and secondary skills and qualifications of the resources in the resource pool. The resource time attributes can include various timing information such as the time the current assignment or project ends if the individual is currently working on a project, the time since the individual was un-assigned if the individual is not working on a definite assignment and the like. The resource location attributes can include the current locations of the resources and/or the home locations of resources for those individuals currently on deputation to different locales away from their home base. If external resources are to be identified, the resource pool 150 may provide links to external websites in accordance with an example. In addition, training and certification and proficiency score that the resource or individual has earned in one or many skills can also be considered.

The resource analyzer 120 can include a resource identifier 122 to process the information from the resource pool 150 in order to identify resources that match the request attributes 114. As mentioned above, each of the skill attributes, the time attributes and the location attributes of the request 112 can be matched with the corresponding skill, time and location attributes of each resource within the resource pool 150. In an example, natural language processing (NLP) techniques can be employed to match the request attributes 114 to the resource attributes 116 of various resources. An AI-based attribute matching procedures as described herein can be used for mapping the request attributes 114 to the resource attributes 116 of each of the resources. Furthermore, a matching index score which can be indicative of an extent to which each of the subset of the resources matches the request attributes is also calculated. The matching index scores can be compared with a predetermined match threshold in order to identify resources that closely match the request attributes 114. If more than one close match is identified, the multiple matches can be displayed to the requestor for further processing. The lock service provider 140 enables the user to place a lock on the selected resources. A locked in resource is therefore selected for a project or work for a specific time period at a specified location. A tagging provider 145 is also included which helps to auto recommend suitable resources having matching scores >80 for e.g., to the request 112 therein providing the user an opportunity to evaluate some best matching resources.

If none of the matching index scores clear the predetermined match threshold, the resource analyzer 120 can further process the request attributes 114 in conjunction with the resource information to provide auto-suggestions that can improve the matching between the request 112 and the resources. The component scores that make up the matching index scores can be analyzed to identify low-scoring component scores. Accordingly, auto-suggestions to alter the corresponding request attributes can be generated by the resource identification system 100.

In an example, the request 112 can pertain to a prospective need for resources. Accordingly, the time period or the time attribute associated with the request can include a future start date or may not include a definite start date in some cases. The resource identification system 100 includes AI-based models that can estimate the likelihood of the prospective need being fulfilled. The requestor is thereby enabled to make future commitments based on the future availability of resources by executing requests for the prospective needs.

The resource analyzer 120 can utilize a channel prediction model 124 to determine a likelihood of the request 112 being satisfied either internally from within the organization or using external resources. In an example, the channel prediction model 124 can be based on logistic regression and can be trained on data comprised of requests that were satisfactorily serviced for the preceding year. The data can include dependent variable which can be the channel of fulfilment (internal and external), while data granularity can be down to each request that was fulfilled. In an example, variables such as but not limited to total number of open requests awaiting fulfilment in the last 3 months for the same skills or existing request pendency and experience levels as specified in the request attributes 114, the number of resources or individuals locked or selected for specific work, the industry groups for which similar requests are raised, the required experience/career levels, the location attributes of the requests and the like. In an example, the likelihood can be obtained as:

Probability=2.66+Coefficient (time period)+Coefficient (Client Tier)+Coefficient (Level)+Coefficient (Client Interview)+Coefficient (Days to start date)+Coefficient (open requests)+Coefficient (resource selection in 45 days), wherein the time period corresponds to the time for which the resource will be occupied with servicing the request 112 (which can be specified as the time attribute), the client tier and client interview are attributes of the clients for whom the resource will be performing the work, the number of open requests and how many of the resources or individuals with the particular skills were selected for specific work in 45 days or less. Other factors such as number of resources awaiting selection and the like may also be included in the probability above. If the probability above is greater than a predetermined fulfilment threshold e.g., 80%, then it is likely that the resource needs to be identified externally else it is likely that the resource can be identified internally within the organization. Based on the likelihood the requestor may opt for internal or externals resource selection. In an example, the predetermined fulfilment threshold can be determined based on the historical probabilities associated with the fulfilled requests. The resource analyzer 120 can further employ a lead time prediction model 126 to determine a number of days until the request 112 is satisfied. The lead time prediction model 126 also employs logistic regression method to make the prediction regarding the time period for the fulfilment of the demand. The variables used in scoring include, the number of requests with similar skill attributes, the number selections that are about to happen over the next thirty days (obtained for example, via soft locks), number of resources currently available for similar skills, required experience level, industry group associated with the request 112, the location attribute of the request 112, time duration as specified in the time attribute, and the like.

The difference between the ready to hard lock (RHL) changed date and the date of closure is used as the dependent variable in the lead time of fulfilment wherein the granularity of the prediction occurs at the request level. RHL-Yes indicates that a request is ready for staffing, and that a scheduling team can start working against it. It can also signify that appropriate funding is available for the request and that the resources being identified can be locked to it.

An example formula for obtaining a lead time to prediction is shown below:

No Of Days to Fulfil=9.05+Coefficient (time period)+Coefficient (client interview)+Coefficient (Level)+Coefficient (Client Tier)+Coefficient (open requests)+Coefficient (Roll off 45 days)+Coefficient (available resources)

wherein the time period corresponds to the time for which the resource will be occupied with servicing the request 112 (which can be specified as the time attribute), the client tier and client interview are attributes of the clients for whom the resource will be performing the work, the number of open requests, the number of the resources or individuals with the particular skills were selected for specific work in 45 days or less and the resources who will be rolled off from the current assignment in the next 45 days and will be ready to take on a new assignment. The intercept values 2.66 and 9.05 can be determined from the logistic regression method.

Similarly, an overdue predictor 128 can provide an indicator on the probability of the request 112 to turn overdue thereby urging the requestor to plan alternate channels of fulfilment. Some of the variables considered in the overdue prediction include but are not limited to, the required start date of the time period for which the resource will be required, the industry group associated with the request, the location at which the resource is required, number of available resources for the skill and location attributes and the like. In an example, the overdue prediction can be obtained as:

Probability of overdue$(P)=(e^x)/[1+(e^x)]$ where x=intercept+(b1*coeff of variable1)+(b2*coeff of variable2)+(b3*coeff of variable3)+(b4*coeff of variable4)+(b5*coeff of variable5), wherein variable1, variable2, variable3, variable4 and variable5 can be selected from the example variables mentioned herein.

Normalised score=$[P-\min(P)]/[\max(P)-\min(P)]$

Following are the three static values from the model—Intercept value=−1.2297, min(P)=5.3%, max(P)=71.4% wherein Min(P) and Max(P) are the minimum and maximum values of P in the model data respectively (adjusted for outliers). These values can remain static and P is the Overdue Probability.

The resource analyzer 120 therefore enables the requestor to formulate a sourcing strategy by providing the channel information, the lead time and the overdue probability. As mentioned above, if a number of requests are received, for example, via a spreadsheet, each of the request can be iteratively processed and a collective output can be produced for the batch of requests.

Based at least on the likelihood of satisfaction of the request 112 and the lead time until the request is satisfied, the resource analyzer 120 can generate further recommendations for the satisfaction of the request 112. In an example, the likelihood of satisfaction of the request 112 and the lead time until the request 112 is satisfied can be presented to the requestor. Based on the request attributes 114 that failed to match the resource attributes 116 and the difference between the request attributes 114 and the resource attributes 116 can lead to suggestions for changing the request attributes 114. For example, if the resource analyzer 120 failed to determine a match based on the time attributes of the request attributes 114, a suggestion to alter the time attributes can be provided. Similarly, a suggestion to alter the location attributes of the request 112 can be provided if an individual with the matching skill and time attributes is identified from the resource pool 150. If the mismatch between the request attributes 114 and the resource attributes 116 occurs due to the skill attributes, the skills ontology 170 can be employed to identify closely related skills. A search of the resource pool 150 for individuals who possess the closely related skills can be conducted. If such individuals who can satisfy other attributes such as time and/or location attributes are identified, links to respective profiles of the matching individuals who possess the closely related skills as identified from the skills ontology 170 can be presented to the requestor. In an example, the resource analyzer 120 can employ Elastic Search in order to identify matching resources.

A custom rule engine 190 is also included in the resource identification system 100 for facilitating execution of various services such as servicing the requests, tagging resources for requests, locking the resources and the like. In an example, the custom rule engine 190 can separate the rules 192 from the application code and treat the rules as shared services. The rules 192 are published as web services thereby facilitating automated execution of decisions. The rules 192 provide for modular division of the functionality of the resource identification system 100 besides governing interaction between different services, how transaction would be managed, data consistency between different services, performance and the like. A demand-specific rule scenario is described herein by the way of illustration and not limitation. For example, a guideline may exist within the organization that a request cannot have its start date modified more than thrice. In this scenario, each time the 'Edit Request' function gets invoked, the rule to verify the number of times the function was invoked may kick in and an appropriate message can be provided to the user in case the start date is edited more frequently than what is allowed by the rule. In case the organization determines that the process needs to be made more stringent by reducing the number of edits to the start date, the corresponding rule can be modified with regards to the demand service in isolation without requiring the resource identification system 100 to be bought down for the change.

Besides the GUIs 160, the resource identification system 100 can offer other user interaction tools such as a query assistant 165 which can include a chat bot. It was observed that answering queries forms a bulk of the tasks executed by the resource identification system 100. It was also observed that many queries are repetitive and related to checkpoints within the procedures executed by the resource identification system 100. Moreover, another issue was identified wherein the responses were not standardized and coupled with the time lag, lead to delays and discrepancies in the execution of processes by the resource identification system 100. The query assistant 165 can be built using a proprietary language processing technology (e.g., LUIS from MICROSOFT) which is able to understand articulated speech and respond in a similar fashion. The query assistant 165 can also have an inbuilt feedback mechanism which provides the necessary assessment of the query assistant's 165 responses in terms of quantity and quality. This feedback can be used to tweak the query assistant's 165 responses in a manner that increases the relevance of responses. The query assistant 165 can be configured to answer queries without human intervention. The prior, inbound queries that were received by the resource identification system 100 or the legacy systems handling similar functions can be retrieved, for example, from historical data. The retrieved prior queries can be analyzed and categorized based on the keywords within the queries. Accordingly, the keywords and categories are identified along with a sequence of priorities.

Figure 2:
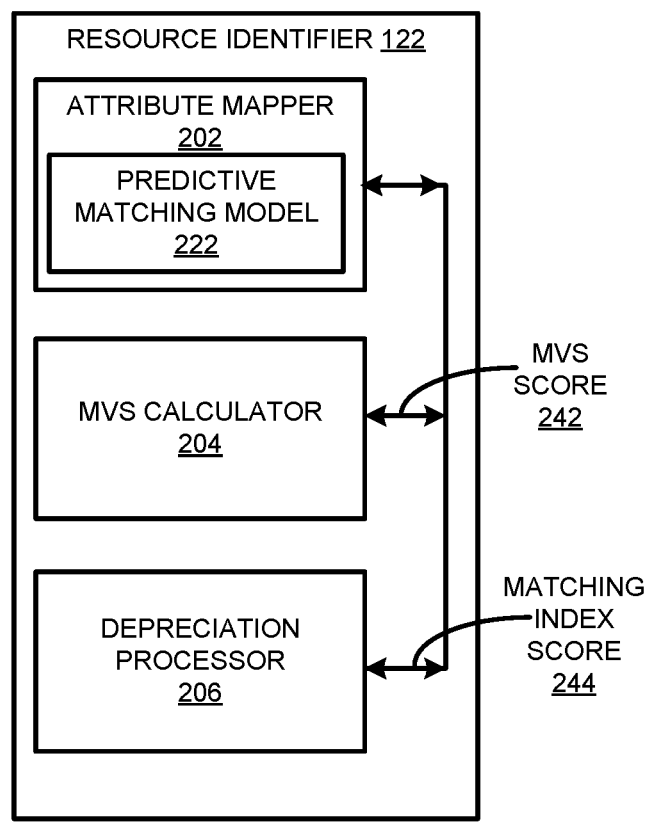
FIG. 2 shows a block diagram of a resource identifier in accordance with the examples disclosed herein.

FIG. 2 shows a block diagram of the resource identifier 122 in accordance with the examples disclosed herein. The resource identifier 122 includes an attribute mapper 202, a multi-variate score (MVS) calculator 204 and a depreciation processor 206. The attribute mapper 202 can use Elastic Search to identify resources with resource attributes 116 that match the request attributes 114. In an example, text matching techniques, code that maps particular attribute names from the request attributes 114 to the resource attributes 116 and other tools can be employed by the attribute mapper 202 for the comparison or mapping of the attributes. As mentioned above, each of the skills attributes which can include not only specific primary and secondary skills but also experience level, time attributes and location attributes are mapped. In an example, the attribute mapper 202 can include a predictive matching model 222 that scores each of the skills, time and location attributes of the request 112 to each of the skills, time and location attributes of each of the resources in the resource pool 150. In an example, the predictive matching model 222 implements logistic regressions and can be explicitly trained on labeled data including prior resource requests that were fulfilled/un-fulfilled. Those resources that match the request attributes 114 can be selected for further processing.

The MVS calculator 204 obtains a multi-variate score (MVS) 242 from the various attributes. The MVS 242 can be obtained from parameters such as but not limited to, one or more of the primary skill match, experience level match (which can be measure in terms of years of experience or hierarchical level within the organization e.g., manager, team lead etc.) and location match. In an example, the MVS 242 can be obtained by applying different weights to each of the attributes for scoring and aggregating the resulting attribute scores. A scoring scheme for the various attributes is described herein solely for the purpose of illustration and not limitation. It can be appreciated that other scoring schemes can be implemented in accordance with other schemes. For example, a weight of 40% of the overall score can be assigned to the skills attributes with the primary skill receiving twice the weight of the secondary or additional skills. The remainder 60% can be assigned to time and location attributes.

The depreciation processor 206 applies various depreciation factors on the MVS 242 to obtain a realistic match. The depreciations applied can include a skill type match depreciation factor if an accurate match for the skills and experience or proficiency level is not obtained for the primary skill as specified in the request 112. An ontology depreciation factor is applied if match is obtained based on a related skill level as identified from the skill ontology 170 and not per an exact match between the request attributes 114 and the resource attributes 116. A primary skill/secondary skill match depreciation factor is applied on the MVS 242 if the match is obtained based on secondary skills and not the primary skill. The finalized score obtained by applying the various depreciation factors on the MVS 242 can be termed as the matching index score 244. The matching index score 244 helps in prioritizing the resources against the request 112.

Figure 3:
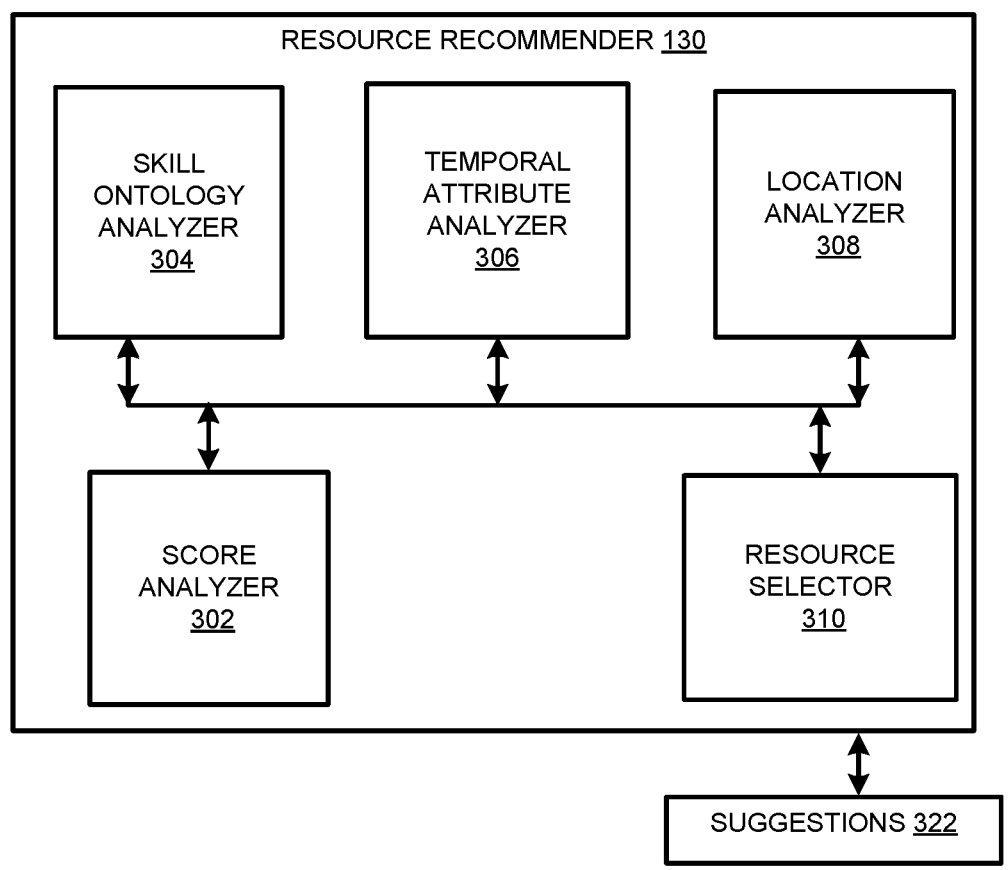
FIG. 3 shows a block diagram of a resource recommender in accordance with the examples disclosed herein.

FIG. 3 shows a block diagram of the resource recommender 130 in accordance with the examples disclosed herein. When appropriate or optimal matched resources cannot be found from currently available resource pool for the request 112 without amending or changing the request attributes 114, the resource recommender 130 provides auto-suggestions for identifying alternate resources or locates and recommends alternate resources which may satisfy the request 112. The auto-suggestions can include changes, updates or adjustments to one or more of the request attributes 114. The suggestions or recommendations are produced by analyzing the request attributes 114 and the resource attributes of the currently available resources. If the matching index score 244 of the request 112 does not meet the predetermined match threshold, the various attributes contributing to the MVS 242 can be analyzed by a score analyzer 302 to identify which of the attributes has received lesser weightage. In an example, the score analyzer 302 can receive the output of the attribute mapper 202 in order to determine which of the skills, time or location attributes contributed to lowering the MVS 242.

Based on the output from the score analyzer 302, the resource recommender 130 may employ one or more of the skill ontology analyzer 304, time attribute analyzer 306 and location analyzer 308 to generate the suggestions 322 for alternate resources which may increase the likelihood of satisfying the request 112. In an example, if the skill attributes of the request attributes 114 contributed to lowering of the MVS 242, the skill ontology 170 is accessed by the skill ontology analyzer 304 and one or more closely related skills are identified. The resource pool 150 is then accessed by the resource selector 310 using the updated attributes e.g., the closely related skills, to identify one or more available resources with skills that match the related skills and links to the profiles of those resources with matching skills can be emailed to the requestor. In case the time or location attributes are contributing to lower MVS 242, the time analyzer 306 or the location analyzer 308 can receive the available resource data and suggest changes in the time or location attributes of the request attributes. Changes to time attributes can include changing a start date for the resource requirement and location attribute can include selection of flexible location. Again, profiles of resources who will be available on later start dates or at alternate locations are identified by the resource selector 310 and emailed within the suggestions 322 to the requestor. In an example, the output of the resource recommender 130 can be combined with the output from one or more of the channel prediction model 124 to determine the likelihood of the request 112 being satisfied when one or more of the skill, time and location attributes are changed. Furthermore, the lead time prediction model 126 can be employed to determine the lead time until the request 112 is satisfied.

Figure 4:
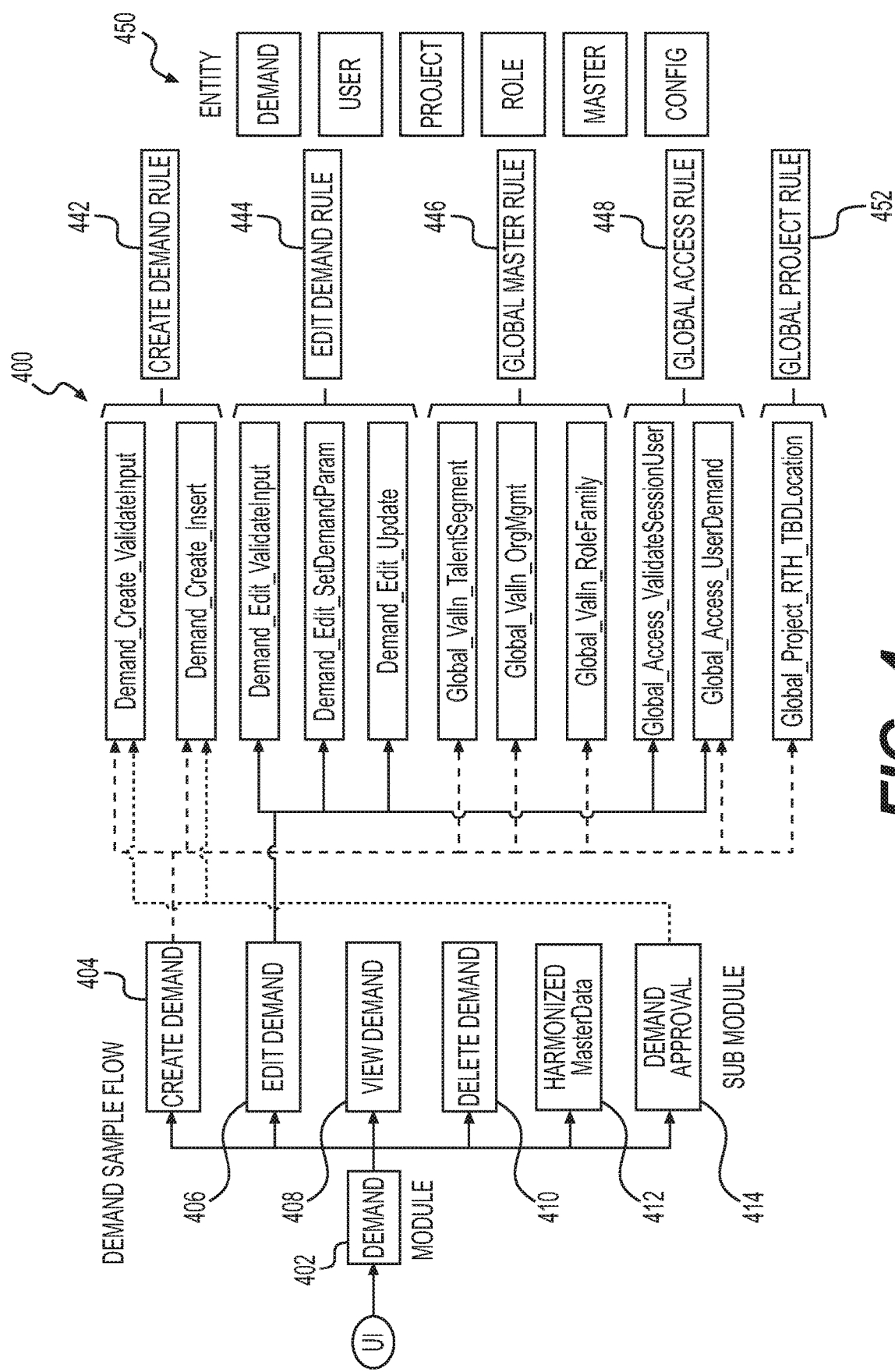
FIG. 4 shows a schematic diagram of a workflow of a custom rule engine that includes rules in accordance with the examples disclosed herein.

FIG. 4 shows a schematic diagram of the workflow of the custom rule engine 190 that includes rules 400 for demand/request service in accordance with the examples disclosed herein. The demand 402 or the request 112 is initially received via, for example, an input GUI. The demand can have functions for creating a new demand 404, editing a demand 406, viewing a demand 408, deleting a demand 410, harmonizing the master data 412 and approval of a demand 414. Various rules enable execution of the functions 404-414. For example, the create demand function 404 can include rules for creating a demand or request 442. Similarly other functions include editing the demand 444, global master rules 446 and global access rules 448 and global project rule 452. Similarly the edit demand function 406 is enabled by the rules for validating input, setting demand parameters, editing an update and global access rules. The rules 400 can refer to various entities 450 such as but not limited to demand, user, project, role, master file and config file.

Figure 5:
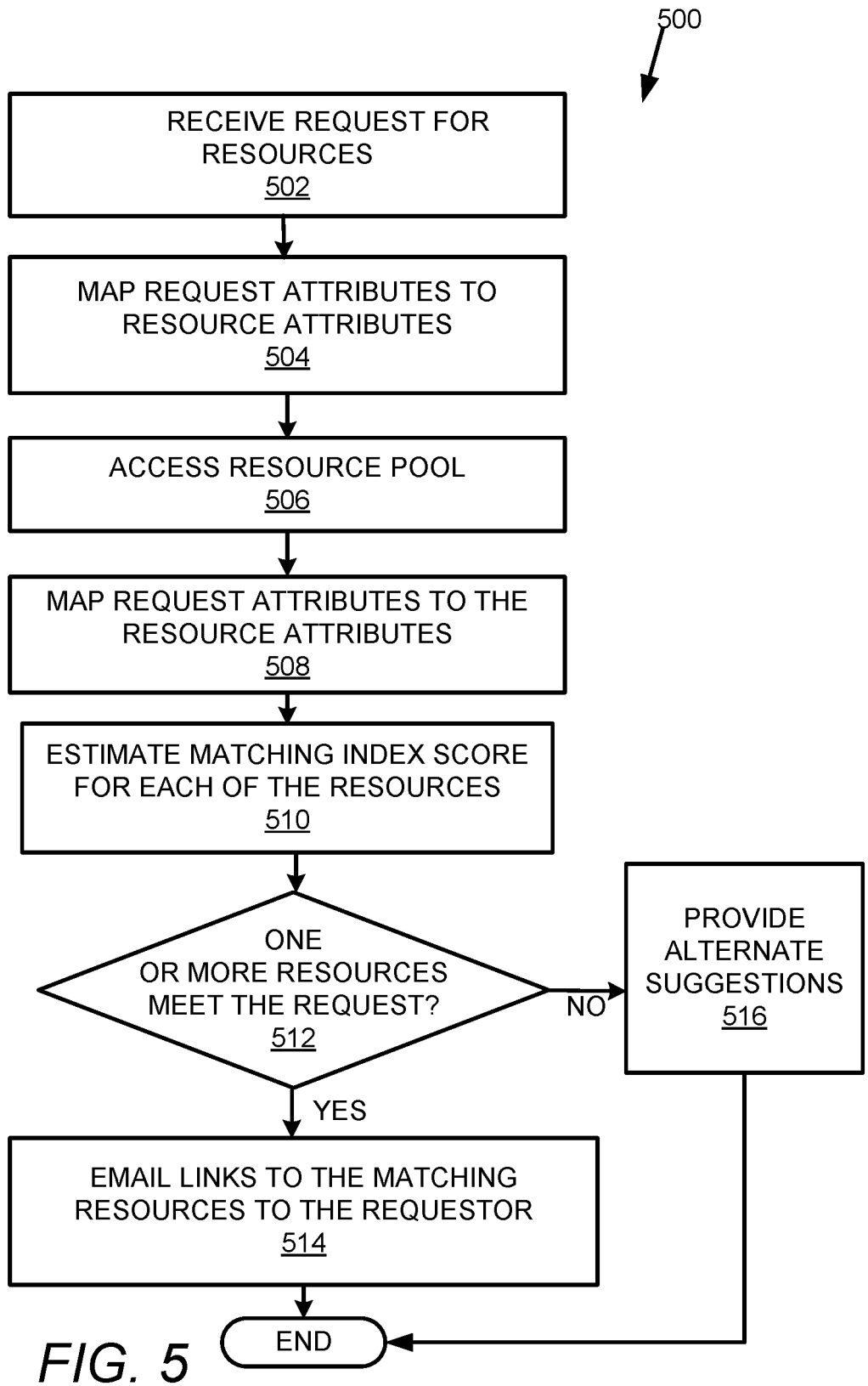
FIG. 5 shows a flowchart that details a method of identifying resources accordance with examples disclosed herein.

FIG. 5 is a flowchart 500 that details a method of identifying resources accordance with examples disclosed herein. The method begins at 502 wherein the request 112 for identification of resources is received. The request 112 can provide the request attributes 114 as name value pairs via an input GUI or via a file. At 504, the request attributes 114 are mapped to the resource attributes 116. As mentioned herein the request attributes 114 can be categorized as skill-related attributes and other attributes. The skill-related attributes can include the role, the primary skill and the additional desired skills, the proficiency and experience in the primary and/or secondary skills, capabilities and specialty and a career level/hierarchical level within the organization. Other attributes include location and time period for which the resource is required.

The resource pool 150 is accessed at 506. In an example, the resource pool 150 can include a database of the resources within the organization and the resource attributes 116. The request attributes 114 are mapped to the resource attributes at 508. In an example, the mapping can include usage of text matching techniques or NLP for comparing the values in the request attributes 114 to the values in the resource attributes 116 of each resource. The extent of mapping can be determined based on component wise scores which can include the skill score that accounts for the skill match between the request attribute and the resource attribute, the skill ontology score which is indicative of the closeness and strength of the relationship between the skill specified in the request attributes and the skill mentioned in the resource attribute, skill proficiency score that is indicative of the proficiency of the resource in a particular skill, level score which signifies the resource's level in the organizational hierarchy and the location score which can be indicative of the resource's current location or location relative to the request location attribute. The total match score can be the sum of the aforementioned component scores.

Accordingly, the matching index score 244 is estimated at 510. Based on the matching index score 244 of each resource, it is determined at 512 if one or more resources that meet the request attributes 114 are available. For example, the matching index score 244 can be compared to the predetermined match threshold. The predetermined match threshold can be determined from matching index scores of profiles that previously served prior requests. If the resources matching the request attributes 114 are available, then links to profiles of such resources are transmitted to the requestor along with other information such as the matching index score and the like at 514. If it is determined at 512 that no resources exist that match the request 112, then alternate suggestions are generated and provided to the requestor at 516.

Figure 6:
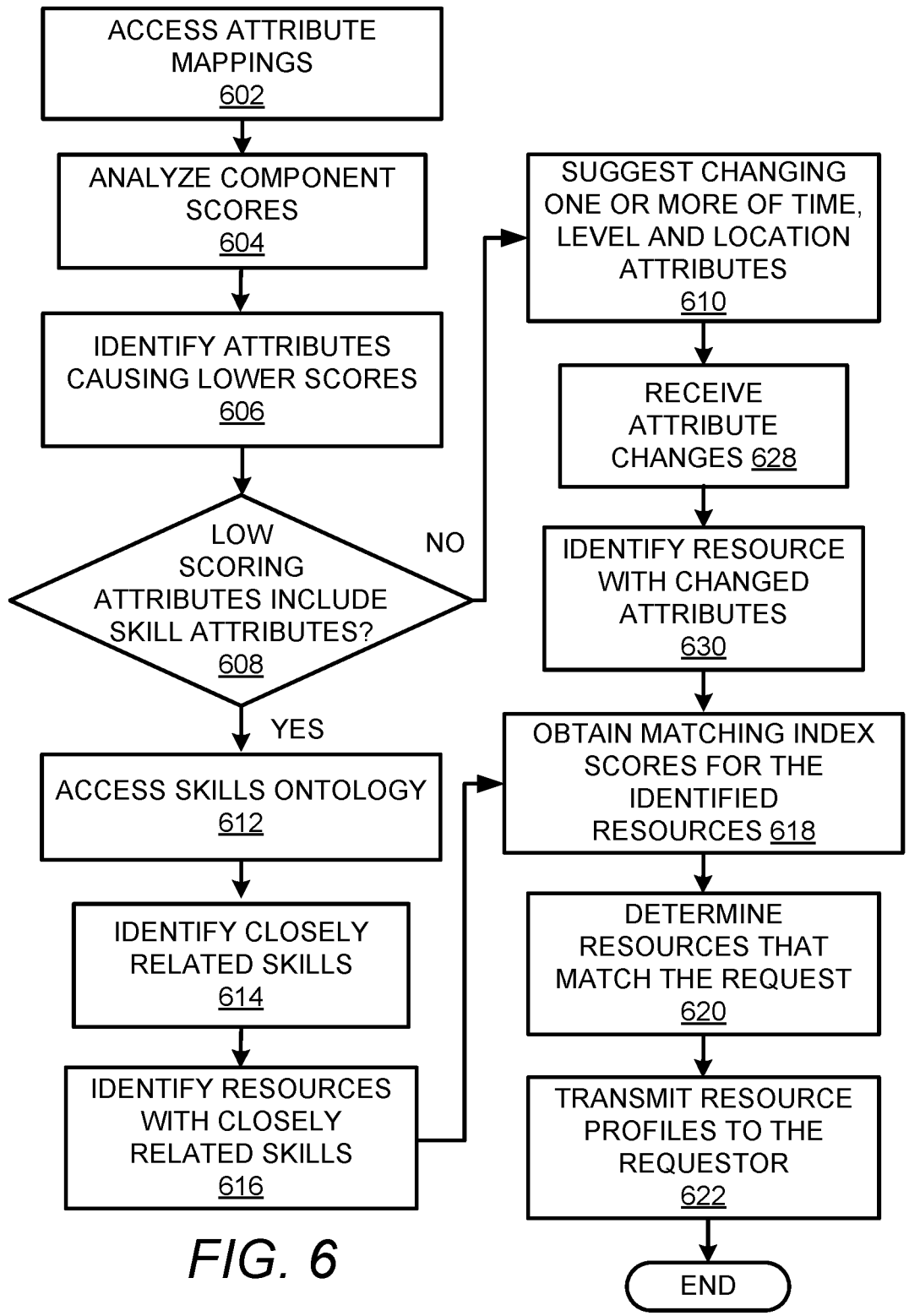
FIG. 6 shows flowchart detailing a method of providing auto-suggestions in accordance with the examples disclosed herein.

FIG. 6 shows a method 600 of providing auto-suggestions when resources that match the request 112 are not identified in accordance with the examples disclosed herein. The method begins at 602 wherein the output of the attribute mapper 202 with attribute mappings between the request attributes 114 and the resource attributes 116 is accessed. The attribute mappings can include the component scores of each value from the request attributes mapped to each attribute value of each of the resources. The component scores can be analyzed at 604, for example, via comparisons with prior historical values of serviced requests or via comparisons with predetermined thresholds. Based on the analysis of the component scores, the attributes that cause lower scores are identified at 606. It is determined at 608 if the attributes that are mismatched or causing lower scores include the skill attributes. If it is determined at 608 that the skills and the career level are matching, the requestor can then be prompted to change or provide a more flexible time/location/career level attribute at 610. The changes to the attributes provided by the requestor are received at 628. The updated/changed attributes are used to execute a search of the resource pool 150 at 630. The resources that match the closely related skills are identified from the resource pool 150 at 616. The matching index scores for the resources are estimated at 618. At 620, the resources that match the request 112 based, for example, on the comparison of the matching index scores with the predetermined match threshold are selected. The details or profiles of the matching resources are transmitted to the requestor at 622. If it is determined at 608 that the attribute causing the mismatch includes the skills attribute, the skills ontology 170 is accessed at 612. At 614, the closely related skills are identified from the skills ontology 170. The method then moves to 618 to obtain the matching index scores for the identified resources with the closely related skills, the resources that match the request are identified at 620 based on the matching index scores and the profiles corresponding to the matching resources are transmitted to the requestor for further selection and processing at 622. The requestor can select one or more of the resources and execute a soft lock or a hard lock on the resources. Locking is the process of securing a resource for an assignment (or request). Soft lock and hard lock are the two mechanisms used for such purposes. A soft lock is executed when further assessment of the resource credibility or other reason exists before issuing a final decision. A soft lock is valid only for 5 days and upon expiration of 5 days for example, the lock will be auto released. A hard lock is executed confirming or finalizing a selection of the resource for a role pertaining to the request.

Figure 7:
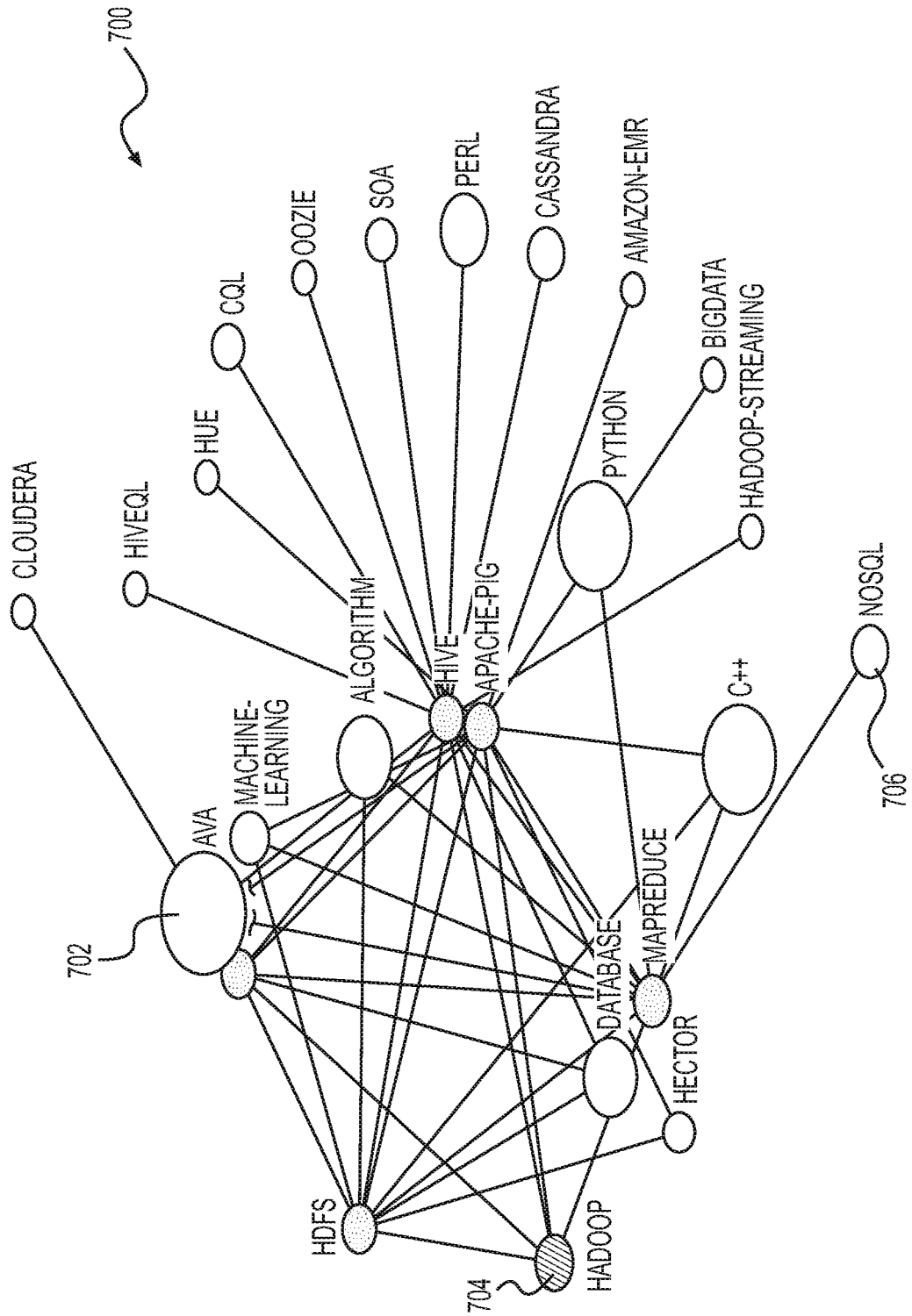
FIG. 7 shows a relational map representing a skills ontology developed in accordance with the examples disclosed herein.

FIG. 7 shows a relational map 700 representing the skills ontology 170 developed in accordance with the examples disclosed herein. Each of the nodes 702, 704 and 706 indicates a respective skill. For example, the nodes include a Java node 702, a Hadoop node 704 and a no sql node 706 to name a few. As seen in FIG. 7, many other skills are also represented. As many as 8000 skills or more can be represented within a given skills ontology. In an example, the size of the node can be representative of the demand for the skill or the number of connections for the skill where it is related to other skills. The relational map 700 can also represent the relationships between the various skills, the strength of the relationships between pairs of skills and the proximity between the given pair of skills.

Figure 8:
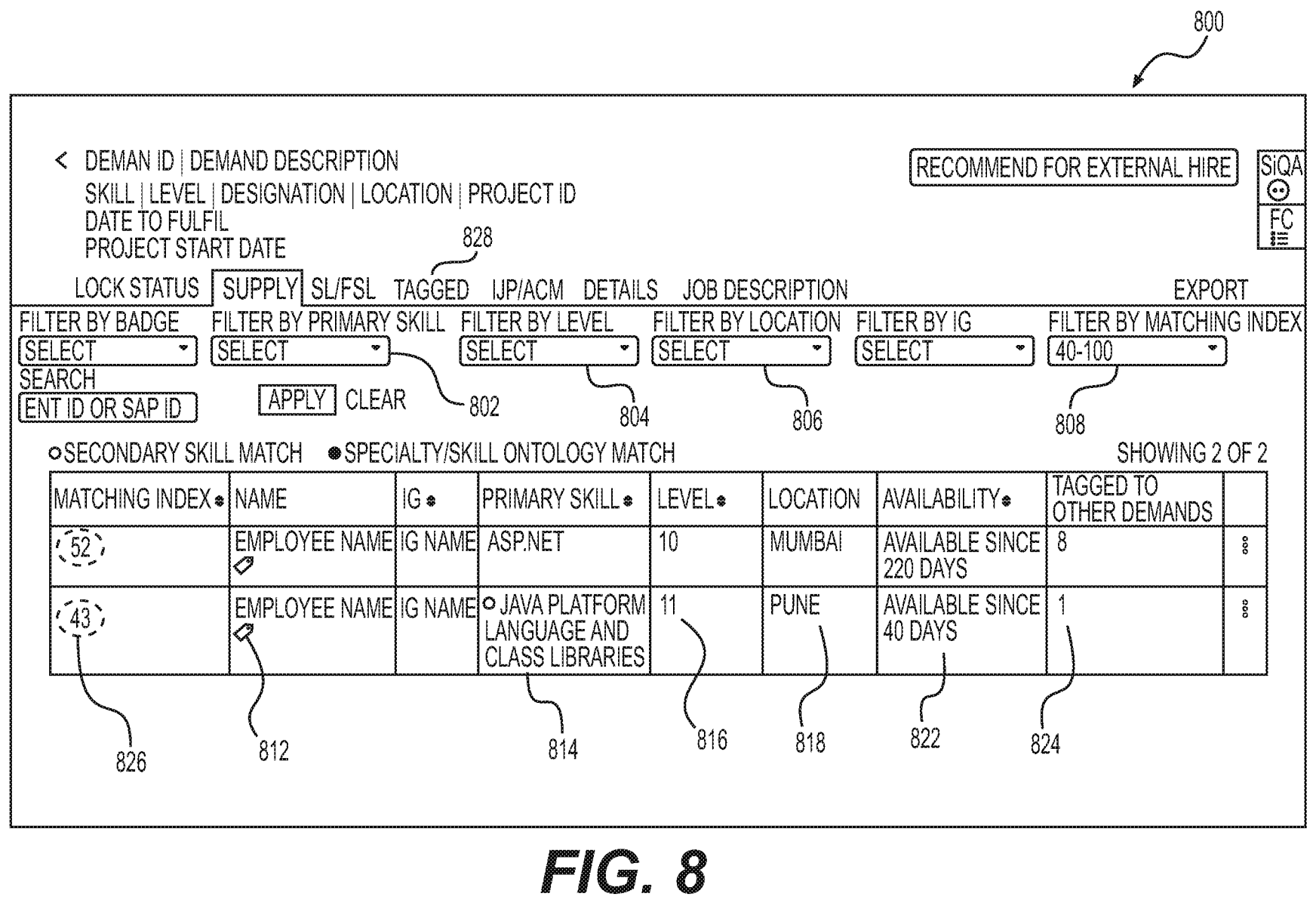

FIG. 8 shows a user interface (UI) 800 that shows the shortlisted resources which match the request attributes in accordance with the examples disclosed herein. Based on the analysis of the request attributes 114 the resources identified from the resource pool 150 are shown in the UI 800. Various filters to filter by primary skill 802, by level 804, by location 806 and by matching index score 808 can be applied. The UI 800 shows different fields including the matching index score 826, the employee name 812, the primary skills 814, the level 816, location 818, availability 822 and whether tagged to other demands/requests 824 are displayed. The tab 828 labelled 'tagged' when selected, displays profiles that are automatically selected by the tagging provider 145 and/or other users of the resource identification system 100 for the particular open request currently being viewed. The profiles can be emailed to the user in one example.

Figure 9:
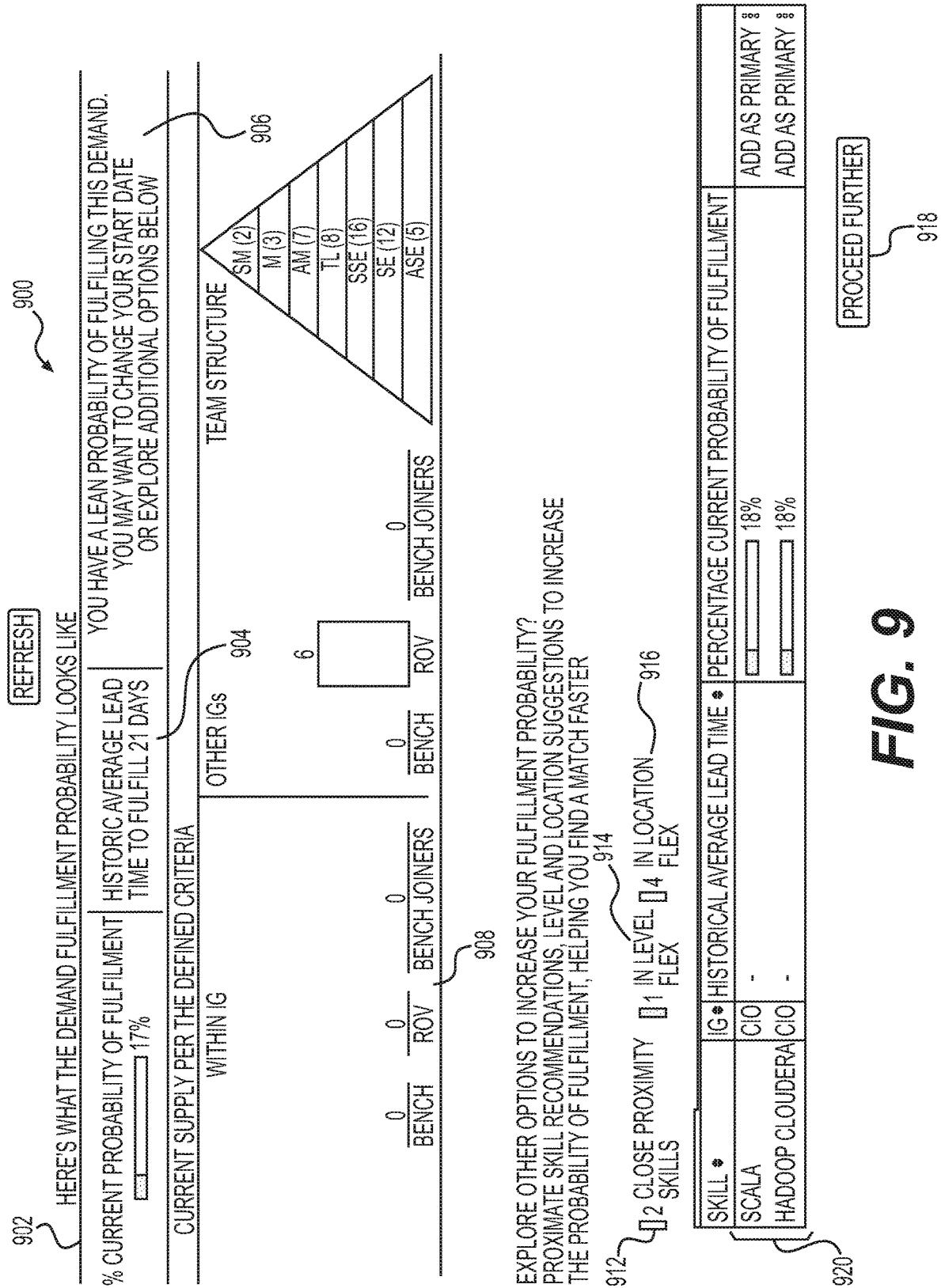
FIG. 9 shows a UI that displays the fulfilment probability and lead time for fulfilment for a given request in accordance with the examples disclosed herein.

FIG. 9 shows a UI 900 that shows the fulfilment probability and lead time for fulfilment for a given request in accordance with the examples disclosed herein. The lead time fulfillment probability 902 is indicated at 17% and the lead time to fulfil 904 is about 21 days. An actionable insight 906 is provided to the requestor that the current fulfilment probability is low and other alternatives may be explored to improve the chances of identifying resources to fulfil the request. The numbers at 902 and 904 are obtained based on the current resource availability as shown at 908. Based on the actionable insight 906, alternate suggestions for other skills 912, other levels 914 and other locations 916 are shown. If the requestor is agreeable to the suggestions 920, the requestor may select further processing via selecting the 'proceed further' button 918.

Figure 10:
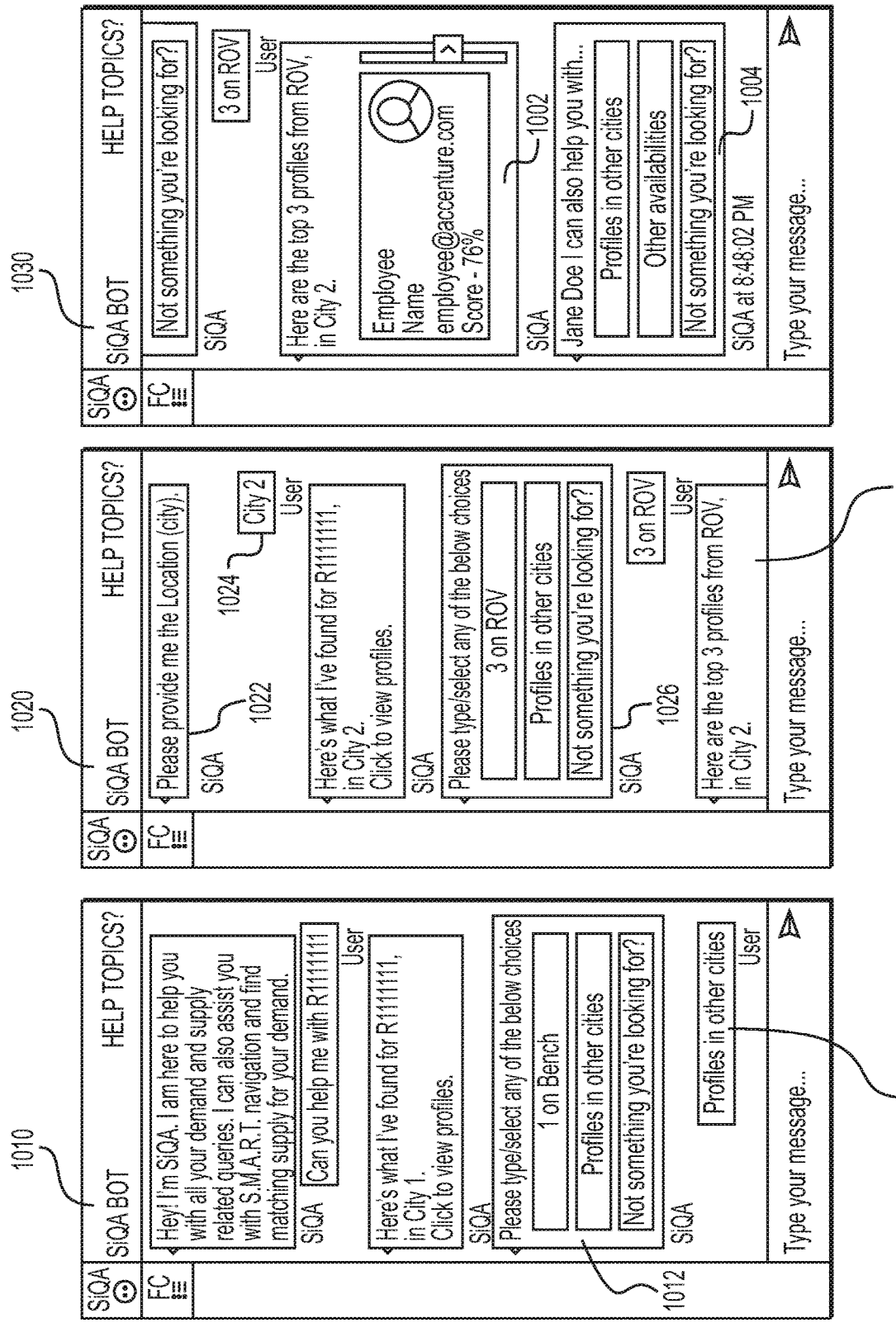
FIG. 10 shows UIs that display a dialog of a requestor with a query assistant in accordance with the examples disclosed herein.

FIG. 10 shows the UIs 1010, 1020 and 1030 that display dialog of the chat bot or the query assistant 165 with the requestor in accordance with the examples disclosed herein. At 1010, the query assistant 165 conveys that it can help with the demand-supply or request-resource related queries, navigating the resource identification system 100 and finding matching resources to a query. In response to which the requestor asks for help with R1111111 request. Various profiles are shown at 1012 and the requestor asks for profiles in other cities at 1014. The dialog is continued into 1020 wherein the query assistant 165 asks for the location/city at 1022. The requestor specifies 'City 2' at 1024. Profiles from city 2 are shown at 1026 and the requestor selects the 3 profiles on ROV for further processing at 1028. Again further dialog between the query assistant 165 and the requestor is continued into UI 1030 wherein, after displaying abbreviated profiles 1002 the query assistant 165 further prompts the requestor at 1004 that more help is available.

FIG. 11A shows an abbreviated profiles UI 1100 that displays certain highlights of some matching resource profiles in accordance with the examples disclosed herein. Two brief profiles 1102 and 1104 are shown with the skills and other details in addition to fulfilment via internal channel and days to fulfil. In an example, 1100, 1102, 1104 are snippets depicting the sourcing strategy for the given skill, level, location combination. Sourcing strategy can include two parts—the internal available supply and the predictions by analytical models. In an example, the profile UI 1100 can be accessed through a separate menu.

Figure 11B:
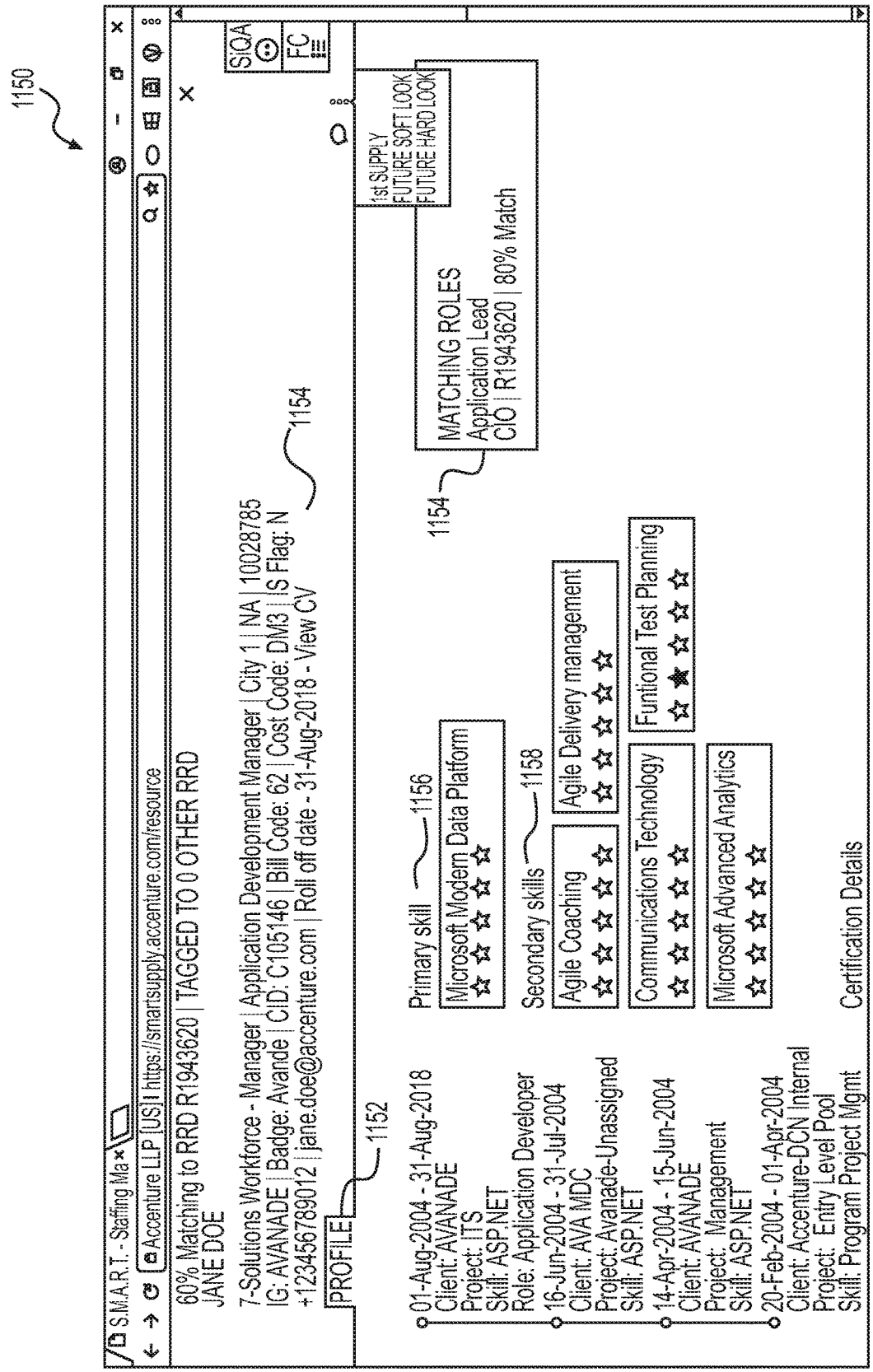
FIG. 11B shows a detailed profile UI that displays the details in a resource profile in accordance with the examples disclosed herein.

FIG. 11B shows a profile UI 1150 that displays the details in a resource profile when selected by a requestor in accordance with the examples disclosed herein. The profile includes work history 1152, the matching roles 1154, the primary skill 1156, secondary skills 1158 and details including contact details 1160.

The resource identification system enables providing rich resource profile information which includes project, training and certification details, project history, skill(s) and competency levels. Furthermore options are provided to search for resources without having a request in place. This concept of skills playground allows the user to search for resources in resource pools through the skill and/or level and/or location parameters and suggest resources in various buckets like Bench, ROV 30, 60, 90, trained pool etc.

Figure 12:
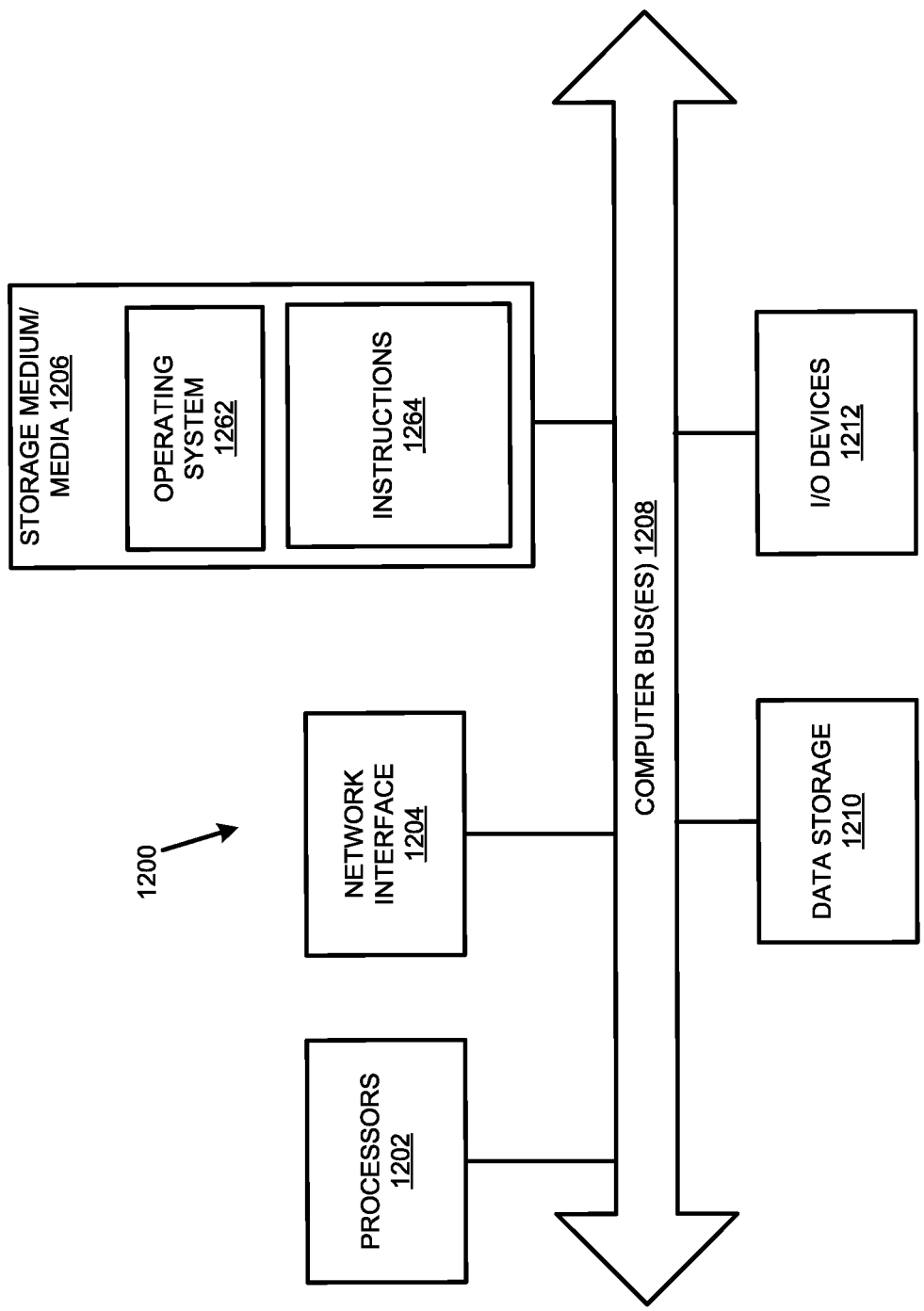
FIG. 12 illustrates a computer system that can be used to implement the AI-based resource identification system in accordance with examples disclosed herein.

FIG. 12 illustrates a computer system 1200 that may be used to implement the resource identification system 100. More particularly, computing machines such as desktops, laptops, smartphones, tablets and wearables which may be used to generate or access the data from the resource identification system 100 may have the structure of the computer system 1200. The computer system 1200 may include additional components not shown and that some of the components described may be removed and/or modified. In another example, a computer system 1200 can sit on external-cloud platforms such as, Amazon Web Services, AZURE cloud or internal corporate cloud computing clusters, or organizational computing resources, etc.

The computer system 1200 includes processor(s) 1202, such as a central processing unit, ASIC or other type of processing circuit, input/output devices 1212, such as a display, mouse keyboard, etc., a network interface 1204, such as a Local Area Network (LAN), a wireless 802.11x LAN, a 3G or 4G mobile WAN or a WiMax WAN, and a computer-readable medium 1206. Each of these components may be operatively coupled to a bus 1208. The computer-readable medium 1206 may be any suitable medium which participates in providing instructions to the processor(s) 1202 for execution. For example, the computer-readable medium 1206 may be non-transitory or non-volatile medium, such as a magnetic disk or solid-state non-volatile memory or volatile medium such as RAM. The instructions or modules stored on the computer-readable medium 1206 may include machine-readable instructions 1264 executed by the processor(s) 1202 to perform the methods and functions of the resource identification system 100.

The resource identification system 100 may be implemented as software stored on a non-transitory computer-readable medium and executed by the one or more processors 1202. For example, the computer-readable medium 1206 may store an operating system 1262, such as MAC OS, MS WINDOWS, UNIX, or LINUX, and code 1264 for the resource identification system 100. The operating system 1262 may be multi-user, multiprocessing, multitasking, multithreading, real-time and the like. For example, during runtime, the operating system 1262 is running and the code for the resource identification system 100 is executed by the processor(s) 1202.

The computer system 1200 may include a data storage 1210, which may include non-volatile data storage. The data storage 1210 stores any data used by the resource identification system 100. The data storage 1210 may be used to store the request attributes, the resource attributes, selected resource details and the like.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based resource identification system comprising:
   at least one processor;
   a non-transitory computer readable medium storing machine-readable instructions that cause the at least one processor to:
      identify request attributes included in a request for one or more resources associated with a resource pool, the request attributes including skill attributes, time attributes including a start date for resource availability and a location attribute including a location associated with the resources being requested;
      access the resource pool that includes resource attributes, the resource attributes include resource skill attributes, resource time attributes and resource location attributes associated with each of one or more resources included in the resource pool;
      match each of the request attributes with corresponding ones of the resource attributes of available resources within the resource pool using a predictive matching model, the predictive matching model determining component scores indicative of extent of matches between the request attributes and the corresponding ones of the resource attributes;
      obtain, from the component scores, matching index scores for at least a subset of the available resources based on the matching between the request attributes and the resource attributes, the matching index scores being indicative of an extent to which each of the subset of the available resources matches the request attributes;
      determine that the matching index scores of the subset of the one or more resources do not clear a predetermined match threshold;
      predict, using a channel prediction model, a likelihood of the request being satisfied by the one or more resources in the resource pool upon updating the request attributes;
      identify the request attributes that are causing lower component scores;
      suggest automatically, updates to the request attributes that are causing the lower component scores; and
      enable display of at least the matching index score with corresponding link to a respective profile of at least one resource from the resource pool that clears the predetermined match threshold, wherein the matching index score with the corresponding link are displayed on a user interface and the at least one resource is identified using the updated request attributes.

2. The resource identification system of claim 1, the non-transitory medium comprising further instructions that cause the processor to:
   compare the matching index scores of each of the subset of the available resources with the predetermined match threshold.

3. The resource identification system of claim 1, wherein the non-transitory medium comprising further instructions that cause the processor to:
   predict, using the channel prediction model, the likelihood of the request being satisfied based at least on an existing request pendency, industry group for which the request is raised, request location, and a number of resources available.

4. The resource identification system of claim 3, the non-transitory medium comprising further instructions that cause the processor to:
suggest, based on the likelihood, the updates to one or more of the request attributes that increase the likelihood.

5. The resource identification system of claim 4, the non-transitory medium comprising further instructions that cause the processor to:
generate the suggestions for the updates including the updates to the skill attributes of the request based on a skill ontology that maps relationships and strengths of the relationships between pairs of skills in a skill inventory.

6. The resource identification system of claim 1, wherein the skills attributes of the available resources include one or more primary skills and one or more secondary skills of the available resources.

7. The resource identification system of claim 1, wherein the predictive matching model is based on linear regression.

8. The resource identification system claim 7, the non-transitory medium comprising further instructions that cause the processor to:
train the predictive matching model on data including prior resource requests that were fulfilled over a predefined time period.

9. The resource identification system of claim 1, the non-transitory medium comprising further instructions that cause the processor to:
predict, using a lead time prediction model, a number of days until the request is fulfilled when the request pertains to prospective resources.

10. The resource identification system of claim 9, wherein the lead time prediction model employs logistic regression for predicting the number of days.

11. The resource identification system of claim 10, the non-transitory medium comprising further instructions that cause the processor to:
determine the number of days by the lead time prediction model based at least on an existing request pendency, the request attributes and the resource attributes.

12. The resource identification system of claim 1, the non-transitory medium comprising further instructions that cause the processor to:
predict, using an overdue prediction model, a likelihood that the request will turn overdue if at least one of the matching index scores does not indicate a match.

13. The resource identification system of claim 12, the non-transitory medium comprising further instructions that cause the processor to:
determine the likelihood of the request turning overdue by the overdue prediction model based at least on an the time attributes of the request, the location attribute of the request, a domain of the request and a skill level specified in the request.

14. The resource identification system of claim 1, the non-transitory medium comprising further instructions that cause the processor to:
enable a query assistant for resolving queries related to the request.

15. A processor-executable method for identifying resources corresponding to a particular resource request, comprising:
obtaining request attributes of a resource request, the request attributes including skill attributes, time attributes and location attributes associated with the resource request;
accessing a resource pool storing resource attributes, the resource attributes including resource skill attributes, resource time attributes and resource location attributes of each resource within the resource pool;
matching each of the request attributes with corresponding ones of the resource attributes of available resources within the resource pool using a predictive matching model;
determining, using the predictive matching model, matching index scores aggregated from component scores, the component scores are indicative of extents of matches between the request attributes and corresponding ones of the resource attributes of each of the resources;
comparing, the matching index scores with a predetermined match threshold;
recognizing that none of the matching index scores meet the predetermined match threshold;
predicting, using a channel prediction model, a likelihood of the resource request being satisfied by resources in the resource pool upon updating the request attributes;
identifying the request attributes that are causing lower component scores;
suggesting automatically, updates to the request attributes that are causing the lower component scores; and
enabling display of at least the matching index score with corresponding link to a respective profile of at least one of the resources from the resource pool that clears the predetermined match threshold, wherein the matching index score and the corresponding link are displayed on a user interface and the at least one resource is identified using the updated request attributes.

16. The method of claim 15, wherein the suggestions for updates to the request attributes further comprise:
suggesting, using a skill ontology and the predictive matching model, a resource with secondary skill matching a primary skill included in the skill attributes of the resource request.

17. The method of claim 15, wherein suggesting the resource further comprises:
applying a proficiency depreciation if a match between the resource request and one of the resources is based on a primary skill;
applying an ontology depreciation factor if the match between the resource request and the resource is based on the skills ontology; and
applying a skill type match depreciation factor based on whether the match is made on the primary skill and one or more secondary skills specified in the resource request.

18. A non-transitory computer-readable storage medium comprising machine-readable instructions that cause a processor to:
identify request attributes included in a request for one or more resources associated with a resource pool, the request attributes including skill attributes, time attributes including a start date for resource availability and a location attribute including a location associated with the resource;
access the resource pool that includes resource attributes, the resource attributes include resource skill attributes, resource time attributes and resource location attributes associated with each of the one or more of the resources associated with the resource pool;
match each of the request attributes with corresponding ones of the resource attributes of available resources within the resource pool using a predictive matching model, the predictive matching model determining component scores indicative of extent of matches between the request attributes and the corresponding ones of the resource attributes of the resources;

obtain, from the component scores, matching index scores for at least a subset of the available resources based on the matching between the request attributes and the resource attributes, the matching index scores are indicative of an extent to which each of the available resources matches the request attributes;

determine that the matching index scores of the subset of the one or more resources do not clear a predetermined match threshold;

predict, using a channel prediction model, a likelihood of the request being satisfied by the one or more resources in the resource pool upon updating the request attributes;

identify the request attributes that are causing lower component scores;

suggest automatically, updates to the request attributes that are causing the lower component scores; and enable display of at least the matching index score with corresponding link to a respective profile of at least one resource from the resource pool having a higher matching index score compared to the predetermined match threshold, wherein the matching index score with the corresponding link to the respective profile are displayed on a user interface and the at least one resource is identified using the updated request attributes.

19. The non-transitory computer-readable storage medium of claim 18, further comprising instructions for:

receiving a selection of the link; and causing a display of at least primary skills, secondary skills, proficiency levels associated with the primary skills and the secondary skills and work history of the matching resource corresponding to the selected link.

\* \* \* \* \*